United States Patent
Ogle et al.

(10) Patent No.: US 9,982,187 B2
(45) Date of Patent: May 29, 2018

(54) DELAYED DELIVERY OF CHEMICALS IN A WELLBORE

(71) Applicant: Halliburton Energy Services, Inc., Houston, TX (US)

(72) Inventors: James William Ogle, Spring, TX (US); Nicholas H. Gardiner, Katy, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/102,793

(22) PCT Filed: Jan. 22, 2014

(86) PCT No.: PCT/US2014/012487
§ 371 (c)(1),
(2) Date: Jun. 8, 2016

(87) PCT Pub. No.: WO2015/112130
PCT Pub. Date: Jul. 30, 2015

(65) Prior Publication Data
US 2016/0326427 A1    Nov. 10, 2016

(51) Int. Cl.
*E21B 43/26* (2006.01)
*C09K 8/80* (2006.01)
(Continued)

(52) U.S. Cl.
CPC ............. *C09K 8/805* (2013.01); *E21B 37/06* (2013.01); *E21B 41/02* (2013.01); *E21B 43/26* (2013.01); *E21B 43/267* (2013.01)

(58) Field of Classification Search
CPC ................................ E21B 43/267; C09K 8/60
See application file for complete search history.

(56) References Cited

U.S. PATENT DOCUMENTS 4,738,897 A * 4/1988 McDougall .............. C09K 8/54
                                                    252/180
5,893,416 A    4/1999 Read
(Continued)

OTHER PUBLICATIONS

Norris, M., et al. "Maintaining Fracture Performance through Active Scale Control. Paper SPE 68300 presented at the International Symposium on Oilfield Scale, Aberdeen, Jan. 30-31." (2001).
(Continued)

*Primary Examiner* — Angela M DiTrani
*Assistant Examiner* — Avi T Skaist
(74) *Attorney, Agent, or Firm* — Craig Roddy; Baker Botts L.L.P.

(57) ABSTRACT

Methods and systems of delivering a treatment chemical are disclosed, including providing a plurality of porous particles each having an outer surface, wherein each of the plurality of porous particles comprises a plurality of pores; infusing the plurality of porous particles with the treatment chemical; coating the plurality of porous particles with a degradable film; adding the plurality of porous particles to a carrier fluid, wherein the degradable film substantially separates the treatment chemical from the carrier fluid; introducing the carrier fluid into a formation; and allowing the degradable film to degrade within the formation.

12 Claims, 3 Drawing Sheets

(51) Int. Cl.
*E21B 37/06* (2006.01)
*E21B 41/02* (2006.01)
*E21B 43/267* (2006.01)

(56) References Cited

U.S. PATENT DOCUMENTS

| | | |
|---|---|---|
| 5,964,291 A | 10/1999 | Bourne et al. |
| 6,209,643 B1 | 4/2001 | Nguyen et al. |
| 7,036,591 B2 | 5/2006 | Cannan et al. |
| 7,216,705 B2 | 5/2007 | Saini et al. |
| 2005/0028976 A1 | 2/2005 | Nguyen |
| 2009/0038799 A1 | 2/2009 | Garcia-Lopez de Victoria et al. |
| 2012/0138303 A1* | 6/2012 | Welton .................. C09K 8/032 166/300 |
| 2013/0248191 A1 | 9/2013 | Nguyen |

OTHER PUBLICATIONS

Webb, P. J. C. "Economic and Technical Features of a Revolutionary Chemical Scale Inhibitor Delivery Method for Fractured and Gravel Packed Wells: Comparative Analysis of Onshore and Offshore Subsea Applications; SPE 39451;1998." Society of Petroleum Engineers, Inc.

Norris, M. R., S. N. Gulrajani, and A. K. Mathur. "Hydraulic Fracturing for Reservoir Management: Production Enhancement." Scale Control and Asphaltine Prevention, paper SPE 71655 presented at the 2001 SPE Annual Technical Conference and Exhibition, New Orleans, LA. vol. 30. 2001.

Selle, Olav Martin, et al. "Downhole Scale Control on Heidrun Field Using Scale Inhibitor Impregnated Gravel." SPE International Conference on Oilfield Scale. SPE Paper 130788, Society of Petroleum Engineers, 2010.

International Search Report and Written Opinion issued in related PCT Application No. PCT/US2014/012487 dated Oct. 10, 2014, 14 pages.

International Preliminary Report on Patentability issued in related Application No. PCT/US2014/012487, dated Aug. 4, 2016 (11 pages).

Yue, et al., "Liquid Scale Inhibitors for Metallic-Crosslinked Gel Fracturing Systems," SPE 169806-MS, Society of Petroleum Engineers (2014).

* cited by examiner

DELAYED DELIVERY OF CHEMICALS IN A WELLBORE

CROSS-REFERENCE TO RELATED APPLICATION

The present application is a U.S. National Stage Application of International Application No. PCT/US2014/012487 filed Jan. 22, 2014, which is incorporated herein by reference in its entirety for all purposes.

BACKGROUND

The present disclosure relates to methods and compositions for use in subterranean operations. More particularly, the present disclosure relates to methods of delivering chemicals to a subterranean wellbore.

Porous proppants and other media have been used to facilitate delivery of chemicals downhole in a wellbore, including delivery of scale inhibitors. Scale inhibitors are a class of chemical treatments typically used to control or prevent scale formation in a production conduit or completion system. The concentration of chemicals used downhole is often closely controlled. In addition, an operation can employ a chemical treatment that lasts for long periods of time, in some instances of months to a year. In addition, the presence of some chemicals downhole may inhibit the efficiency of other chemicals. For example, the presence of scale inhibitors can adversely impact the ability of metal-based crosslinkers to effectively crosslink the gelling agents present in a fracturing fluid.

BRIEF DESCRIPTION OF THE DRAWINGS

These drawings illustrate certain aspects of some of the embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to methods and compositions for use in subterranean operations. More particularly, the present disclosure relates to methods of delivering chemicals to a subterranean wellbore.

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
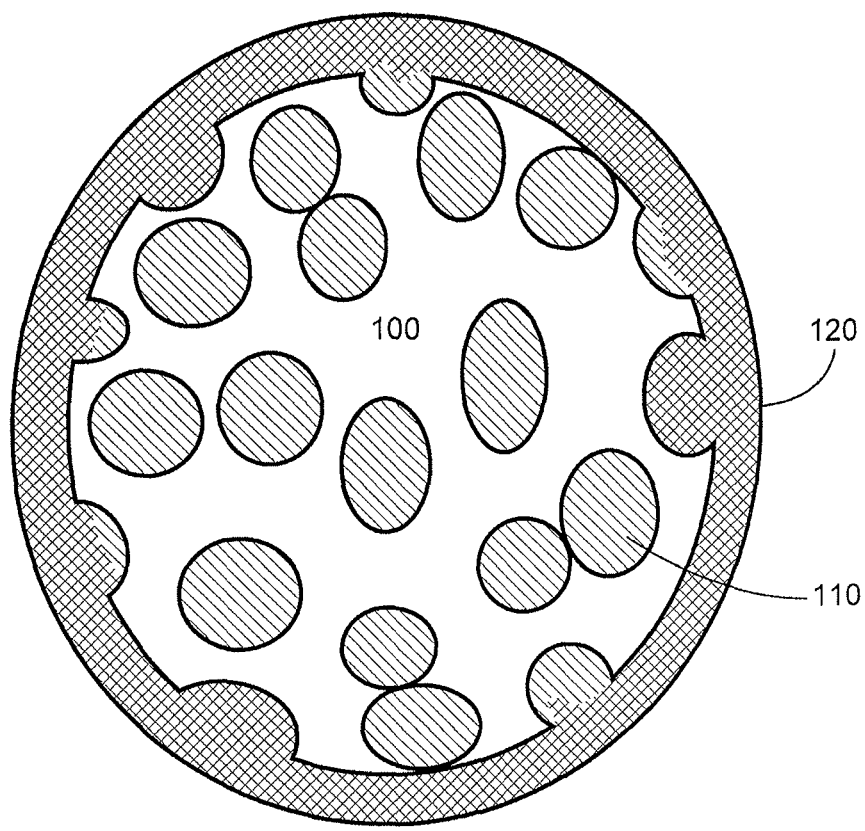
FIG. 1 is an illustration of an example porous particle comprising an outer coating, incorporating certain aspects of the present disclosure.

The methods and compositions of the present disclosure involve the formation and/or use of porous particles that have been infused with a treatment chemical, the porous particles having an outer surface, a plurality of pores, and a degradable film on the outer surface. An illustration of one embodiment of a porous particle according to certain aspects of the present disclosure is shown in FIG. 1. A plurality of porous particles 100 infused with a treatment chemical may be used to transport and release the treatment chemical downhole. Each of the porous particles 100 may comprise a plurality of pores 110. In certain embodiments, the plurality of pores 100 may be located on a surface of the porous particle 100. In certain embodiments, the plurality of pores 100 may be located substantially throughout the porous particle 100. In certain embodiments, the porous particles 100 may be proppant particulates. For example, the porous particles may comprise ceramic, silicon, glass, or any other suitable porous materials. In other embodiments, the porous particles may comprise silica, zeolite, diatomite, or sepiolite.

In certain embodiments, the porous particles may be infused with the treatment chemical, for example, using a vacuum saturation method. The vacuum saturation method may comprise first exposing the porous particles to a high vacuum to remove air from the plurality of pores located on the porous particles. Next, the porous particles may be exposed to a solution of the treatment chemical, causing the porous particles to absorb the treatment chemical. As a result, the porous particles may contain the treatment chemical in the plurality of pores 110.

The treatment chemical may comprise any chemical suitable for use as a downhole treatment chemical. For example, the treatment chemical may include a scale inhibitor, asphaltene inhibitor, corrosion inhibitor, gel system breaker, surfactant, emulsion breaker or any other downhole treatment chemical. In certain embodiments, the scale inhibitor may comprise a phosphonate derivative, such as DETA phosphonate.

In certain embodiments, the porous particles may be infused with the treatment chemical using the vacuum saturation method, a high mixing method, or any method to apply the treatment chemical known to one of ordinary skill in the art.

The porous particles infused with the treatment chemical may be at least partially coated or encapsulated with a degradable film. FIG. 1 illustrates an example of a degradable film 120 on the surface of porous particle 100. In certain embodiments, substantially the entire outer surface of porous particles may be coated with the degradable film. The degradable film may, among other purposes, serve to delay the release of the treatment chemical. Any method of applying a coating of the degradable film to the porous particles may be used. For example, in certain embodiments, the degradable film may be applied to the porous particles using a spray coating, a liquid coating, or a dry coating technique. In certain embodiments, the coating of the degradable film may be applied using coating equipment. The degradable film may be of any thickness, which may depend on, among other factors, the desired rate of release and/or the desired delay of release of the treatment chemical. The degradable film may be of a substantially uniform or varying thickness across the surface of the porous particle. In certain embodiments, the coating may be about 20% to about 60% of the porous particle mass.

In certain embodiments, the degradable film may comprise any material that degrades or dissolves, for example, after a period of time in the subterranean formation, when contacted by a particular fluid or fluids, and/or when subjected to certain conditions. Examples of degradable materials that may be used include, but are not limited to, polylactides/polylactic acid, polyglycolides/polyglycolic acid, polyvinylalcohol, aliphatic polyesters, poly(c-caprolactone); poly(hydroxybutyrate), poly(anhydrides), aliphatic polycarbonates, poly(acrylamide), poly(ortho esters), poly (amino acids), poly(ethylene oxide), polyphosphazenes, latex, or other degradable polymers. In certain embodiments, the degradable film 120 may comprise a slowly degrading salt or other degradable inorganic materials. The particular composition of the degradable film suitable for a particular application of the present disclosure may depend on, among other factors, the requirements of the operation and the downhole properties.

In certain embodiments, the degradable film may prevent clumping and/or sticking of the porous particles. In certain embodiments, the degradable film may lubricate the porous particles to further reduce clumping. As such, the degradable film may facilitate a more even disbursement of the porous particles when added to a carrier fluid. The carrier fluid may be any fluid to be added to a wellbore penetrating a subterranean formation that may transport the porous particles. In certain embodiments, the carrier fluid may comprise a fracturing fluid. In certain embodiments, the carrier fluid may further carry non-porous proppants and/or other porous proppants not infused with a treatment chemical.

In certain embodiments, the porous particles may be added to the carrier fluid before the carrier fluid is added to the wellbore. In certain embodiments, the porous particles may be added to the carrier fluid after the carrier fluid is added to the wellbore. In certain embodiments, the carrier fluid may be added to the wellbore using one or more pumps. When added to the carrier fluid, the degradable film may substantially separate the treatment chemical infused into the plurality of pores from the carrier fluid and/or other elements in the well bore until at least partial degradation of the degradable film occurs. Once the degradable film has at least partially degraded, a portion of the surface of the porous particle may be exposed to the carrier fluid. When a portion of the surface of the porous particle is exposed to the carrier fluid, a portion of the treatment chemical exposed to the carrier fluid may diffuse from the porous particle into the carrier fluid. As such, the degradable film may substantially prevent infusion of the treatment chemical into the carrier fluid until the degradable film is at least partially degraded.

The degradable film may be completely degraded when substantially the entire surface of the porous particle is exposed to the carrier fluid. The degradable film may be partially degraded when a portion of the porous particle is exposed, but the complete surface of the porous particle is not exposed. In certain embodiments, the degradable film may be degraded to a partially degraded state before the degradable film is completely degraded. The treatment chemical may be said to be activated when exposed to the carrier fluid. When the degradable film is partially degraded, the infusion rate of the treatment chemical from the porous particle to the carrier fluid may be less than the infusion rate when the degradable film is completely degraded. In addition, degradation of the degradable film may be gradual, where an increasing percentage of the porous particle may be exposed to the carrier fluid over time. As such, in certain embodiments, degradation of the degradable film may result in a gradual increase in the infusion rate of the treatment chemical into the carrier fluid, resulting in a corresponding gradual increase in the concentration of the treatment chemical in the carrier fluid following initial exposure of the porous particle to the carrier fluid.

The degradation rate of the degradable film may be adjusted by altering the degradable film composition and/or the carrier fluid properties, as would be appreciated by one of ordinary skill in the art with the benefit of the present disclosure. For example, the pH and/or temperature of the carrier fluid may be changed to increase or decrease the degradable film degradation rate, as desired. Other downhole factors may also affect the degradation rate, including oxidation changes, exposure to hydrocarbons, exposure to radiation, and/or pressure changes. In certain embodiments, the degradable film may completely degrade in a period of time from about 1 second to about three months after the porous particle is placed in the carrier fluid. In certain embodiments, the degradable film may completely degrade in a period of time from about 30 minutes to about 24 hours after addition to the carrier fluid.

In certain embodiments, more than one set of porous particles may be used to deliver treatment fluid to the wellbore. For example, two sets of porous particles may be infused with a scale inhibitor treatment chemical, where the first set of porous particles may be coated with a degradable film that degrades three hours after addition to the carrier fluid and the second set of porous particles may be coated with a degradable film that degrades three months after addition to the carrier fluid. The staggered degradation times and corresponding treatment chemical activation times may allow a treatment regime to be designed for an extended period of time, for example, over the course of a year, without further addition of treatment chemicals to the wellbore.

As an additional example, two sets of porous particles may be infused with different treatment chemicals, the first infused with a scale inhibitor treatment chemical and the second infused with a crosslinker treatment chemical. The porous particle infused with the crosslinker treatment chemical may be coated with a degradable film that degrades a short period of time after addition to the carrier fluid, for example, ten seconds to one minute after addition. The porous particle infused with the scale inhibitor treatment chemical may be coated with a degradable film that degrades several hours after addition to the treatment fluid. As a result, the crosslinker treatment chemical may be activated and complete the crosslink job before the scale inhibitor treatment chemical may be activated.

As will be appreciated by one of ordinary skill in the art with the benefit of the present disclosure, treatment combinations may be designed depending on the needs of a given operation and the interaction of the various treatment chemicals used.

In embodiments comprising porous particles encapsulated with polylactic acid or polyglycolic acid, the degradation rate of the degradable film may be adjusted by changing the pH of the carrier fluid, as will be recognized by a person of ordinary skill with the benefit of this disclosure. In addition, the degradation rate a degradable film comprising polylactic acid or polyglycolic acid may be increased, for example, by adding amine compounds to the carrier fluid.

Figure 2:
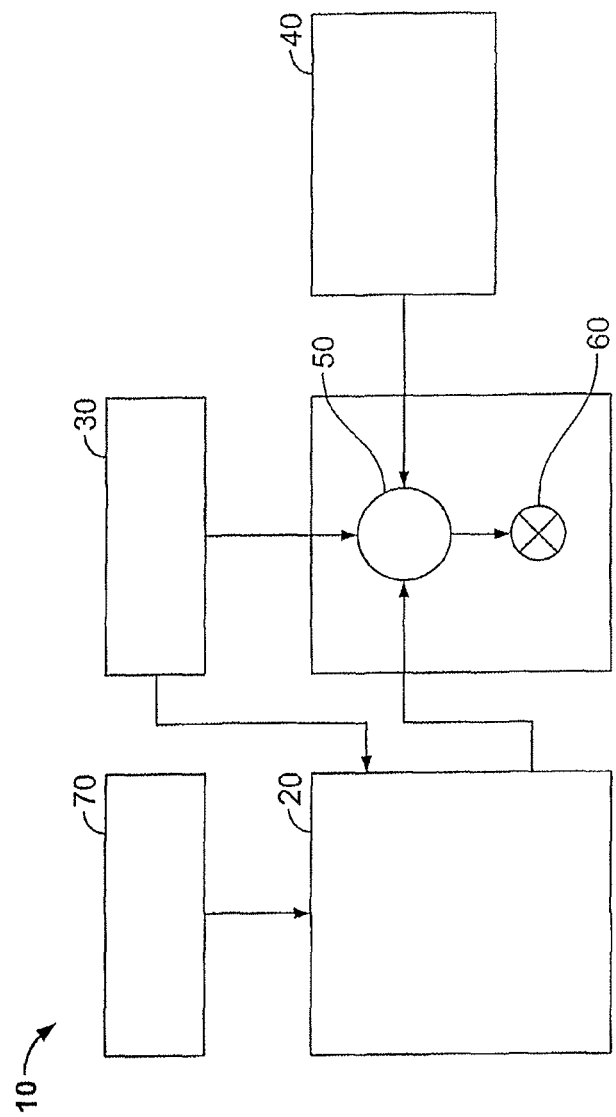
FIG. 2 is a diagram illustrating an example of a fracturing system that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 2, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants or slurries of the present disclosure at other times, and combinations of those components at yet other times.

Figure 3:
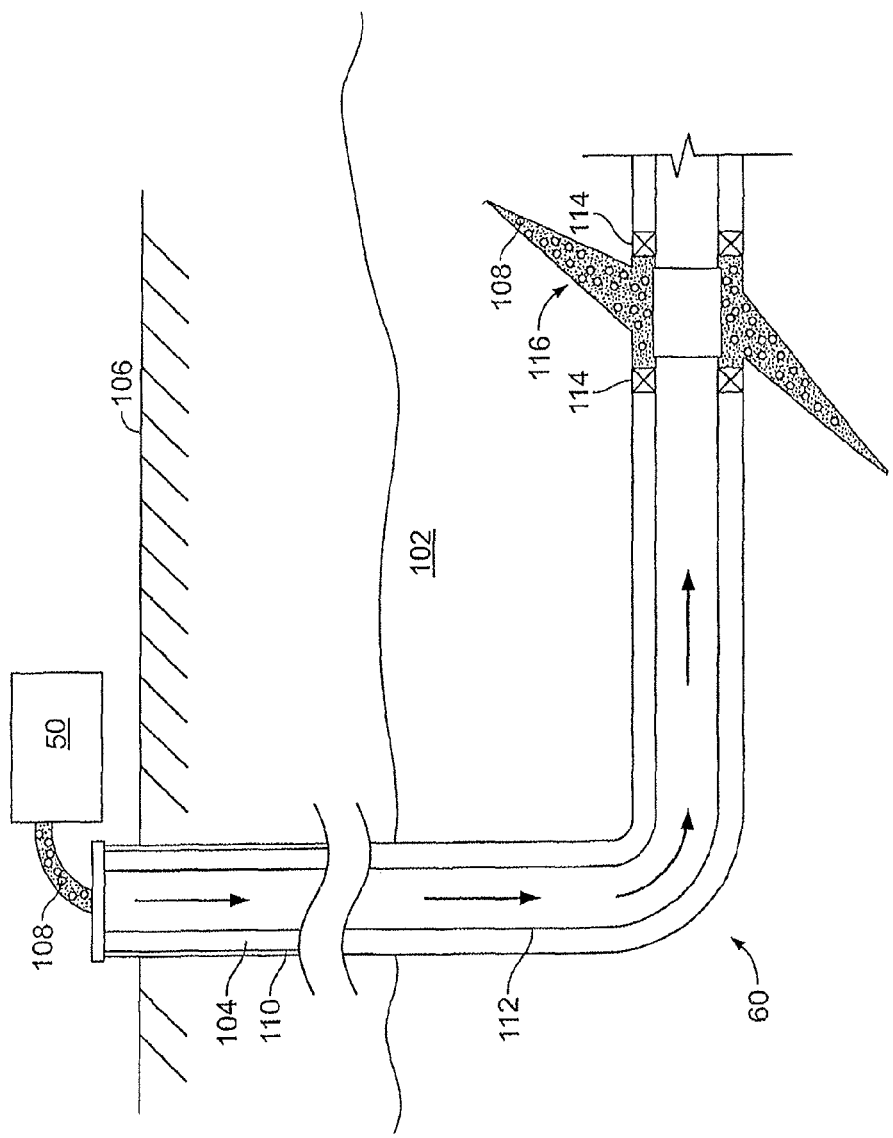
FIG. 3 is a diagram illustrating an example of a subterranean formation in which a fracturing operation may be performed in accordance with certain embodiments of the present disclosure.

FIG. 3 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 3, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In certain embodiments, a method of delivering a treatment chemical may comprise providing a plurality of porous particles each comprising a plurality of pores; a treatment chemical infused into at least one of the plurality of pores; an outer surface coated with a degradable film; adding the plurality of porous particles to a carrier fluid; and introducing the carrier fluid into a subterranean formation.

In certain embodiments, a method of delivering a treatment chemical to a formation may comprise providing a plurality of porous particles each having an outer surface, wherein each of the plurality of porous particles comprises a plurality of pores; infusing the plurality of porous particles with the treatment chemical; coating the plurality of porous particles with a degradable film; adding the plurality of porous particles to a carrier fluid located within the formation, wherein the degradable film substantially separates the treatment chemical from the carrier fluid; and allowing the degradable film to degrade within the formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially" of or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:

providing a plurality of porous particles each comprising:
- a plurality of pores;
- a treatment chemical infused into at least one of the plurality of pores, wherein the treatment chemical in a first group of the plurality of porous particles comprises a metal crosslinker and the treatment chemical in a second group of the plurality of porous particles comprises a scale inhibitor; and
- an outer surface;

coating the outer surface of the first group of the plurality of porous particles with a first degradable film and coating the second group of the plurality of porous particles with a second degradable film;

adding the plurality of porous particles to a carrier fluid, wherein the carrier fluid comprises a gelling agent, wherein the first degradable film degrades in the carrier fluid within about one minute or less, and the second degradable film degrades in the carrier fluid at least an hour after the plurality of porous particles are added to the carrier fluid;

introducing the carrier fluid into a subterranean formation;

degrading the first degradable film within the formation; and allowing the metal crosslinker to crosslink at least a portion of the gelling agent in the presence of the second group of the plurality of porous particles.

2. The method of claim 1, wherein the carrier fluid is introduced into the subterranean formation using one or more pumps.

3. The method of claim 1, wherein the plurality of porous particles comprise a proppant.

4. The method of claim 1, further comprising degrading the second degradable film within the subterranean formation.

5. The method of claim 1, wherein the second degradable film degrades within the formation in a period of time of from about one hour and about three months.

6. The method of claim 1, wherein the second degradable film degrades within the formation in a period of time of from about one hour and about 24 hours.

7. A treatment system, comprising:

a plurality of porous particles each comprising an outer surface, wherein each porous particle comprises a plurality of pores disposed in the porous particle;

a first treatment chemical comprising a metal crosslinker within a first group of porous particles, and a second treatment chemical comprising a scale inhibitor within a second group of porous particles;

a first degradable film at least partially coating the outer surface of the first group of porous particles, and a second degradable film at least partially coating the outer surface of the second group of porous particles are coated with a second degradable film; and a carrier fluid comprising a gelling agent, the carrier fluid having the plurality of porous particles mixed into the carrier fluid, and wherein the degradable film substantially separates the outer surface of the plurality of porous particles from the carrier fluid, wherein the first degradable film degrades in the carrier fluid within about one minute or less of adding the plurality of porous particles to the carrier fluid and the second degradable film degrades at least an hour after adding the plurality of porous particles to the carrier fluid.

8. The system of claim 7, wherein the first degradable film or the second degradable film comprises a degradable polymer.

9. The system of claim 7, wherein the first degradable film or the second degradable film comprises polylactic acid.

10. A method of delivering a treatment chemical to a subterranean formation, comprising:

providing a plurality of porous particles each comprising an outer surface, and a plurality of pores;

infusing the plurality of porous particles with a treatment chemical, wherein the treatment chemical in a first group of the plurality of porous particles comprises a metal crosslinker and the treatment chemical in a second group of the plurality of porous particles comprises a scale inhibitor;

coating the first group of the plurality of porous particles with a first degradable film, and coating a second group of the plurality of porous particles with a second degradable film;

adding the plurality of porous particles to a carrier fluid located within the formation, wherein the carrier fluid comprises a gelling agent, wherein the first degradable film and the second degradable film substantially separates the treatment chemical from the carrier fluid, wherein the first degradable film degrades in the carrier fluid within about one minute or less, and the second degradable film degrades in the carrier fluid at least an hour after the plurality of porous particles are added to the carrier fluid;

degrading the first degradable film within the formation; and allowing the metal crosslinker to crosslink at least a portion of the gelling agent in the presence of the second group of the plurality of porous particles.

11. The method of claim 10, wherein the plurality of porous particles are coated using coating equipment.

12. The method of claim 10, wherein the plurality of porous particles comprise a proppant.

* * * * *